(12) United States Patent
Mikami et al.

(10) Patent No.: US 12,370,406 B2
(45) Date of Patent: Jul. 29, 2025

(54) ROTATION STATE ESTIMATION DEVICE, METHOD AND PROGRAM

(71) Applicant: NIPPON TELEGRAPH AND TELEPHONE CORPORATION, Tokyo (JP)

(72) Inventors: Dan Mikami, Tokyo (JP); Mariko Isogawa, Tokyo (JP); Kosuke Takahashi, Tokyo (JP); Yoshinori Kusachi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 644 days.

(21) Appl. No.: 17/438,867

(22) PCT Filed: Mar. 4, 2020

(86) PCT No.: PCT/JP2020/009014
§ 371 (c)(1),
(2) Date: Sep. 13, 2021

(87) PCT Pub. No.: WO2020/189265
PCT Pub. Date: Sep. 24, 2020

(65) Prior Publication Data
US 2022/0152453 A1  May 19, 2022

(30) Foreign Application Priority Data
Mar. 18, 2019 (JP) .................. 2019-049667

(51) Int. Cl.
*G06T 7/20* (2017.01)
*A63B 24/00* (2006.01)
*A63B 69/00* (2006.01)
*A63B 102/18* (2015.01)

(52) U.S. Cl.
CPC ...... *A63B 24/0021* (2013.01); *A63B 69/0002* (2013.01); *G06T 7/20* (2013.01);
(Continued)

(58) Field of Classification Search
CPC ......... G06T 7/20; G06T 7/70; A63B 2220/05; A63B 2024/0034; A63B 2102/18; A63B 69/0002; A63B 24/0021
See application file for complete search history.

(56) References Cited

U.S. PATENT DOCUMENTS

2006/0285755 A1* 12/2006 Hager .................. G06V 20/653
382/224
2013/0156262 A1* 6/2013 Taguchi .................... G06T 7/75
382/103
(Continued)

FOREIGN PATENT DOCUMENTS

CN 103679186 A * 3/2014
CN 104488279 A * 4/2015 ............. A63F 13/00
(Continued)

OTHER PUBLICATIONS

"Fast and Globally Convergent Pose Estimation from Video Images," by Chien-Ping Lu et al., IEE Transactions on Pattern Analysis and Machine Intelligence, vol. 22, No. 6, Jun. 2000. (Year: 2000).*
(Continued)

*Primary Examiner* — Steven J Hylinski

(57) ABSTRACT

A technique that enables, even if a video image corresponding to one period is not obtained, estimating a rotational state of an object is provided. The rotational state estimation device includes: an object image generation unit 1 that generates object images, each of the object images being an image of an object, from an input video image; and a rotational state estimation unit 3 that estimates a rotational state of the object by selecting, from among a plurality of hypotheses of the rotational state, a hypothesis of the rota-
(Continued)

tional state, a likelihood of an image of the object resulting from the object in the object image at a certain time being rotated for $t_c$ unit time based on the hypothesis of the rotational state being high, using the object image at a time t and the object image at a time $t+t_c$ where $t_c$ is a predetermined integer of no less than 1.

6 Claims, 9 Drawing Sheets

(52) U.S. Cl.
CPC ... *A63B 2024/0034* (2013.01); *A63B 2102/18* (2015.10); *A63B 2220/05* (2013.01)

(56) References Cited

U.S. PATENT DOCUMENTS

| | | | |
|---|---|---|---|
| 2015/0178927 A1* | 6/2015 | Olszamowski | G06T 7/73 |
| | | | 382/103 |
| 2015/0371440 A1* | 12/2015 | Pirchheim | G06T 7/33 |
| | | | 345/419 |
| 2018/0232901 A1* | 8/2018 | Segert | G06T 7/77 |
| 2019/0087661 A1* | 3/2019 | Lee | G06V 10/82 |

FOREIGN PATENT DOCUMENTS

| | | | | |
|---|---|---|---|---|
| EP | 1522878 A1 | * | 4/2005 | ........... G01V 5/0016 |
| EP | 2116975 A2 | * | 11/2009 | ........... G06T 7/2033 |
| EP | 3182373 A1 | * | 6/2017 | .............. G06T 7/70 |
| JP | H0921610 A | * | 7/1995 | |
| JP | 4663966 B2 | * | 4/2011 | ............. G01S 5/163 |
| WO | WO-0186935 A2 | * | 11/2001 | ............... G06T 7/20 |
| WO | WO-2009047335 A1 | * | 4/2009 | ............. G06F 17/50 |
| WO | WO-2011163341 A2 | * | 12/2011 | ........... G06K 9/6215 |
| WO | WO-2019117892 A1 | * | 6/2019 | ......... G06F 16/7837 |

OTHER PUBLICATIONS

Jiri et al. (2017) "Automatic spin measurements for pitched Baseballs via consumer-grade high-speed cameras", Signal, Image and Video Processing, vol. 11, Issue 7.

* cited by examiner

Fig. 6
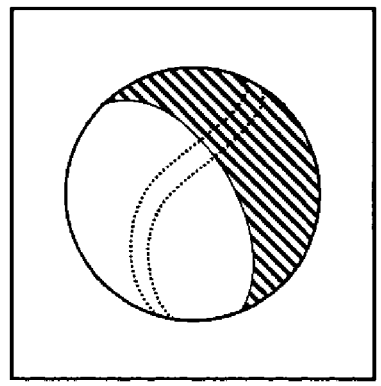
(b)
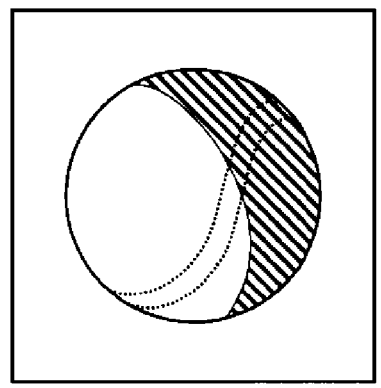
(a)

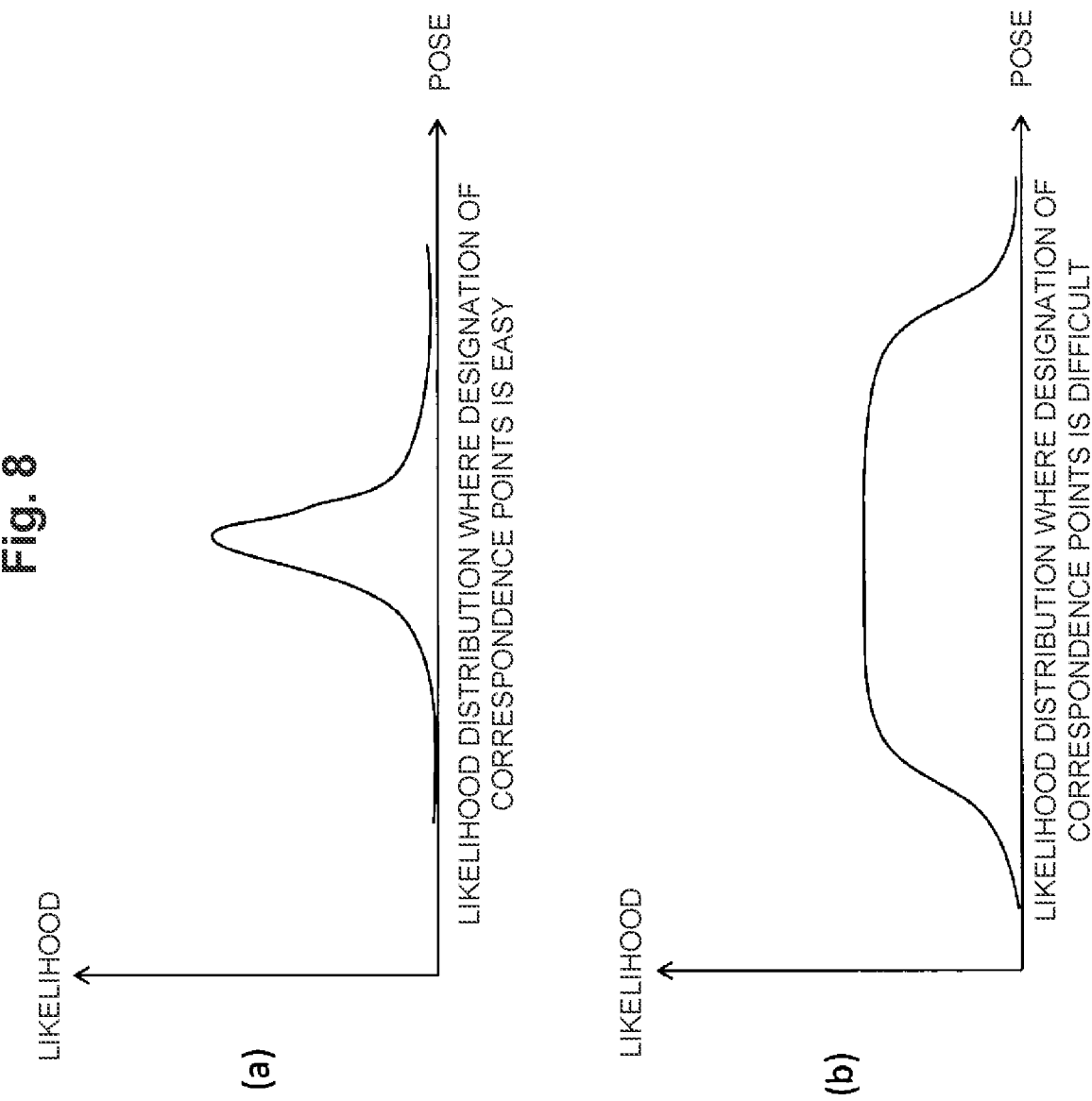

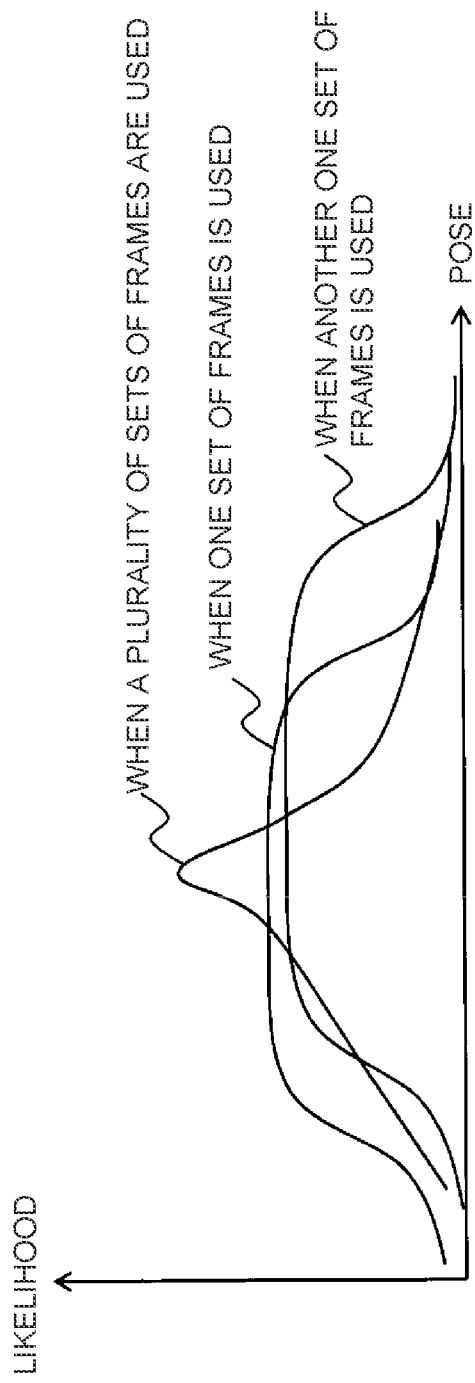

ROTATION STATE ESTIMATION DEVICE, METHOD AND PROGRAM

CROSS-REFERENCE TO RELATED APPLICATIONS

This application is a U.S. 371 Application of International Patent Application No. PCT/JP2020/009014, filed on 4 Mar. 2020, which application claims priority to and the benefit of JP Application No. 2019-049667, filed on 18 Mar. 2019, the disclosures of which are hereby incorporated herein by reference in their entireties.

TECHNICAL FIELD

The present invention relates to estimating a rotational state of an object such as a flying ball.

BACKGROUND ART

As a technique that estimates a rotational state of an object, the technique described in Non-Patent Literature 1 has been known.

The technique in Non-Patent Literature 1 will be described in more detail with reference to FIG. 4. FIG. 4(a) is a diagram in which a pattern on a ball 5 is simplified for ease of understanding. FIG. 4(b) illustrates the ball 5 flying straight toward a camera 6. FIG. 4(c) illustrates the ball 5 flying obliquely relative to the camera 6.

In the technique in Non-Patent Literature 1, first, a period T is obtained based on a similarity in appearance. A frame corresponding to a period T is a frame that is 25 frames ahead, which depends on the rotation rate of the ball and the shooting frame rate, though. For example, where the rotation rate of the ball is 2000 RPM and the shooting frame rate is 960 FPS, the ball makes one rotation with 28.8 frames.

In this way, in the technique in Non-Patent Literature 1, a period T can be obtained by detecting a time t+T at which an appearance of a ball in a certain frame t shows up again. Then, in the technique in Non-Patent Literature 1, the rotation rate of the ball can be estimated from the obtained period T. Also, in the technique in Non-Patent Literature 1, a rotation axis is further estimated by obtaining an amount of rotation in one frame of a video image 1 from the estimated rotation rate.

CITATION LIST

Non-Patent Literature

Non-Patent Literature 1: Takashi Ijiri, Atsushi Nakamura, Akira Hirabayashi, Wataru Sakai, Takeshi Miyazaki, Ryutaro Himeno, "Automatic spin measurements for pitched Baseballs via consumer-grade high-speed cameras", Signal, Image and Video Processing, Vol. 11, Issue 7, 2017.

SUMMARY OF THE INVENTION

Technical Problem

In the technique in Non-Patent Literature 1, if a time during which a ball can be observed is short, in other words, if a video image corresponding to one period is not obtained, a rotational state cannot be estimated.

An object of the present invention is to provide a rotational state estimation device, method and program that enable, even if a video image corresponding to one period is not obtained, estimating a rotational state of an object.

Means for Solving the Problem

A rotational state estimation device according to an aspect of this invention includes: an object image generation unit that generates object images, each of the object images being an image of an object, from an input video image; and a rotational state estimation unit that estimates a rotational state of the object by selecting, from among a plurality of hypotheses of the rotational state, a hypothesis of the rotational state, a likelihood of an image of the object resulting from the object in the object image at a certain time being rotated for $t_c$ unit time based on the hypothesis of the rotational state being high, using the object image at a time t and the object image at a time $t+t_c$ where $t_c$ is a predetermined integer of no less than 1.

Effects of the Invention

Even if a video image corresponding to one period is not obtained, a rotational state of an object can be estimated.

BRIEF DESCRIPTION OF DRAWINGS

FIGS. 6(a) and 6(b) are diagrams illustrating that when a ball changes in position, a shadow on the ball changes according to a lighting environment.

FIGS. 8(a) and 8(b) are diagrams indicating that a width of a likelihood distribution varies depending on the texture of the object.

FIG. 9 is a diagram indicating that where a plurality of frames are used, a width of a likelihood distribution becomes narrow.

DESCRIPTION OF EMBODIMENTS

Embodiment

Figure 1:
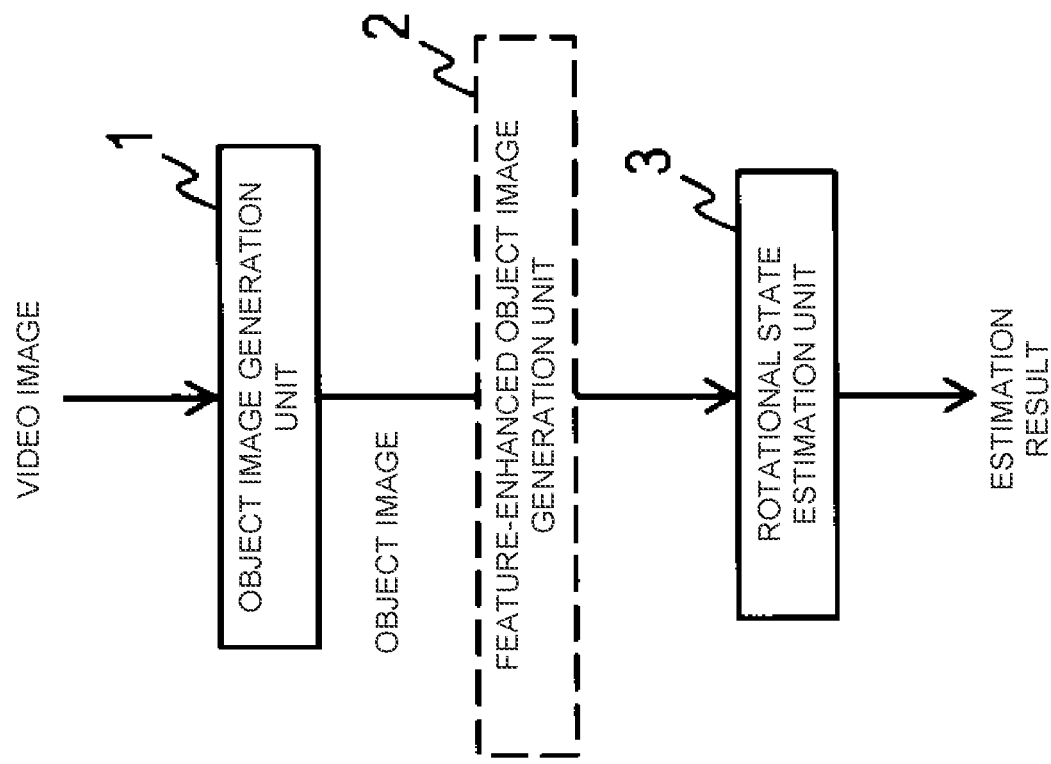
FIG. 1 is a diagram illustrating an example of a functional configuration of a rotational state estimation device.

An embodiment of the present invention will be described in detail below. Note that in the figures, component units having a same function are provided with a same reference numeral and overlapped description thereof is omitted.

As illustrated in FIG. 1, a rotational state estimation device includes, for example, an object image generation unit 1 and a rotational state estimation unit 3.

Figure 2:
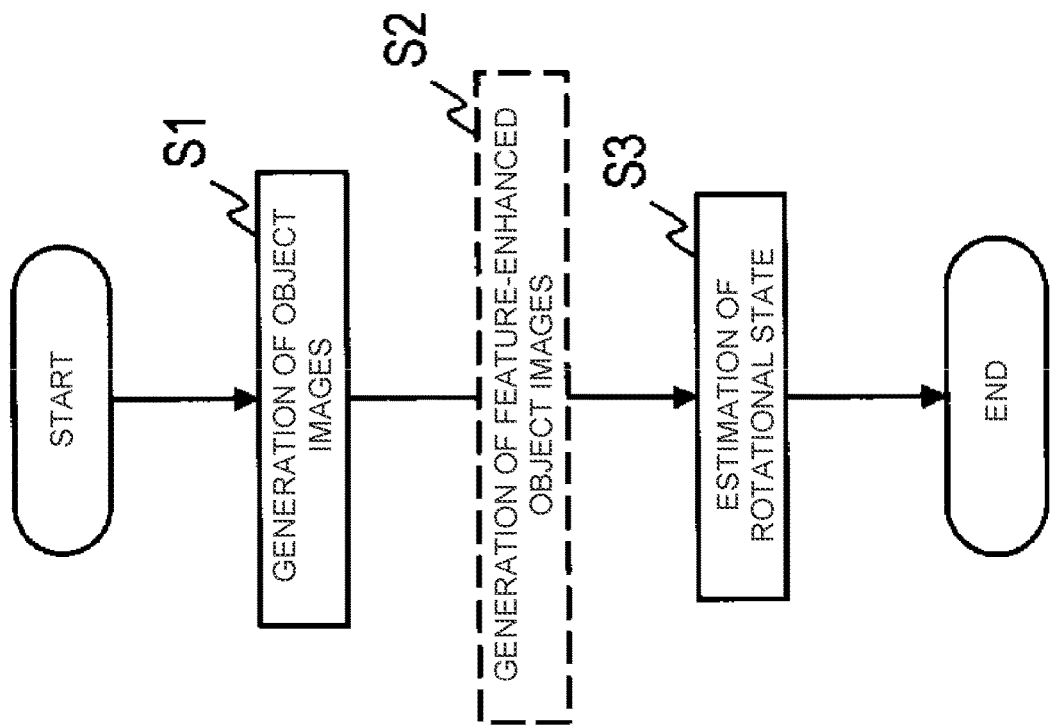
FIG. 2 is a diagram illustrating an example of a processing sequence of a rotational state estimation method.
Figure 3:
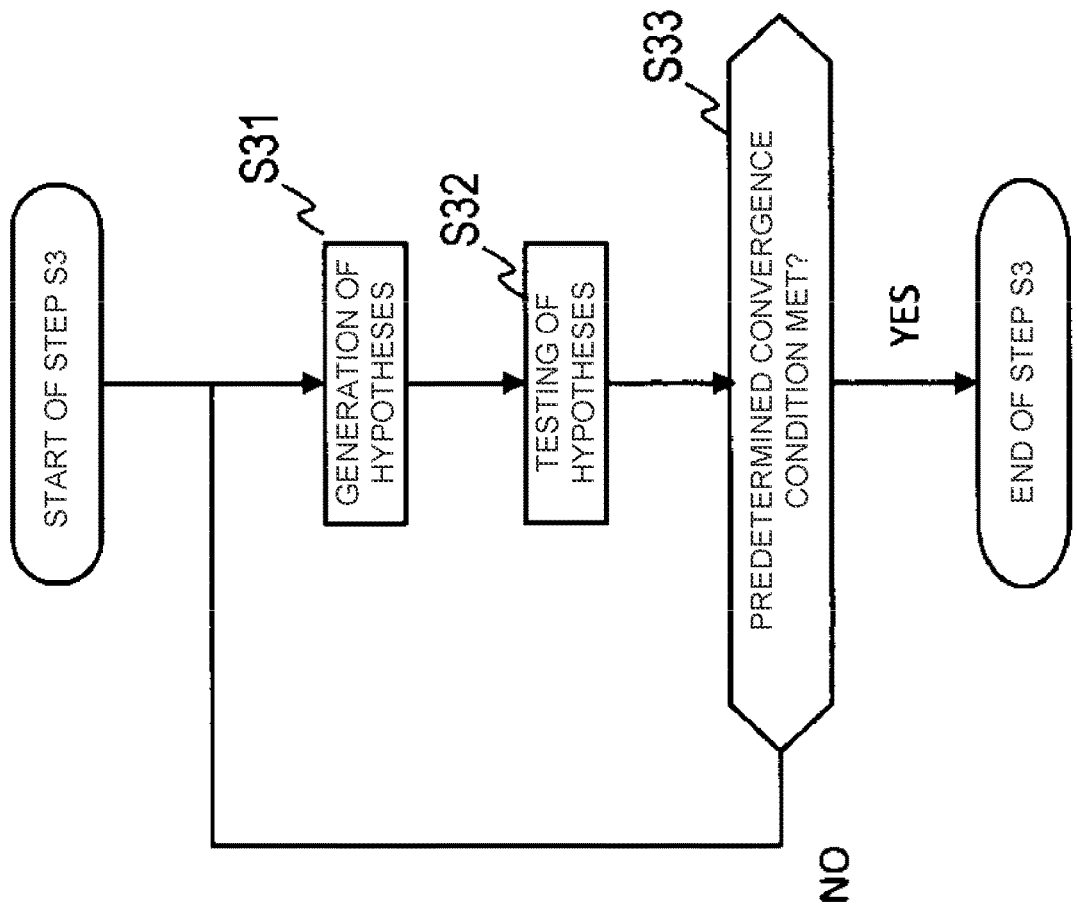
FIG. 3 is a diagram illustrating an example of a processing sequence in step S3.

A rotational state estimation method is implemented, for example, by the respective component units of the rotational state estimation device performing the below-described processing in step S1 and step S3 indicated in FIG. 2.

The respective component units of the rotational state estimation device will be described below.

<Object Image Generation Unit 1>

The object image generation unit 1 receives an input of a video image of an object. The object is a physical body that is an object of estimation of a rotational state. Examples of the object include a ball. The below description will be provided taking a case where the object is a baseball, as an example. It should be understood that the object is not limited to a baseball. The rotational state is at least one of a rotation rate or a rotational axis of the object.

The object image generation unit 1 generates object images, each of which is an image of the object, from the input video image (step S1). Each object image is, for example, a partial area of one frame image in the input video image, the partial area being cut out in such a manner that the entire object is included in the object image with a center of the object as a center of the image. The object image generation unit 1 cuts the partial area out from one frame image in the input video image in such a manner that the partial area includes the entire object and has a rectangular shape having a size that allows provision of a margin of a known size around the object to obtain the object image. An example of the margin of a known size can be 0.5 times a radius of the object. In other words, the margin can have a square shape having a side length that is three times the radius of the object, which is a total of the margin on the left side of the object (0.5 times the radius of the object), the object (radius that is twice the radius) and the margin on the left side of the object.

The generated object images are output to the rotational state estimation unit 3.

The object image generation unit 1 needs to detect the object before the generation of the object images. For detection of the object, the object image generation unit 1 may use a known object detection method. For example, where the object is a baseball, the object image generation unit 1 can detect the ball by means of, e.g., matching with a ball template or detection of a circle using Hough transform. For detection of a circle, a known circle detection method can be used.

As necessary, the object image generation unit 1 resizes the object images so that a size of the object is the same among a plurality of object images corresponding to respective frame images. For example, where the object is a baseball, the object image generation unit 1 resizes the object images so that a diameter of the ball is the same among a plurality of object images corresponding to respective frame images.

<Rotational State Estimation Unit 3>

The rotational state estimation unit 3 receives an input of the object images generated in the object image generation unit 1.

The rotational state estimation unit 3 estimates a rotational state of the object by selecting, from a plurality of hypotheses of the rotational state, a hypothesis of the rotational state, a likelihood of an image of the object resulting from the object in an object image at a certain time being rotated for $t_c$ unit time based on the hypothesis of the rotational state being high, using an object image at a time t and an object image at a time $t+t_c$ (step S3).

In other words, the rotational state estimation unit 3 estimates the rotational state of the object by selecting a hypothesis of the rotational state, an image of the object resulting from the object in an object image at a certain time being rotated for $t_c$ unit time based on the hypothesis of the rotational state and an object image at a time $t_c$ unit time later being close to each other, from among a plurality of hypotheses of the rotational state.

Symbol $t_c$ is a predetermined integer of no less than 1. For example, $t_c=1$. The integer $t_c$ may be smaller than an assumed period T of rotation of the object. As an example of the unit time, a time that passes in one frame is used. However, a time that passes in two frames can be used as the unit time.

For example, the rotational state estimation unit 3 repeats the below-described processing in step S31 and step S32 until the estimated rotational state converges.

Step S31 is processing for generating a plurality of hypotheses of the rotational state, which is performed by the rotational state estimation unit 3.

Step S32 is processing for evaluating the hypotheses, which is performed by the rotational state estimation unit 3.

In the below, the processing in steps S31 and step S32 in the rotational state estimation unit 3 will be described taking an example in which the rotational state is estimated using the object image at the time t and the object image at the time $t+t_c$.

First, the rotational state estimation unit 3 generates a plurality of hypotheses of the rotational state (step S31). For example, the rotational state estimation unit 3 generates a plurality of hypotheses based on a probability distribution provided in advance. Note that in an initial state, generally, there is no prior information and the rotational state estimation unit 3 thus generates a plurality of hypotheses based on a uniform probability distribution.

Then, the rotational state estimation unit 3 generates an image of the object resulting from the object in the object image at the time t being rotated for $t_c$ unit time based on each of the hypotheses of the rotational state.

Figure 5:
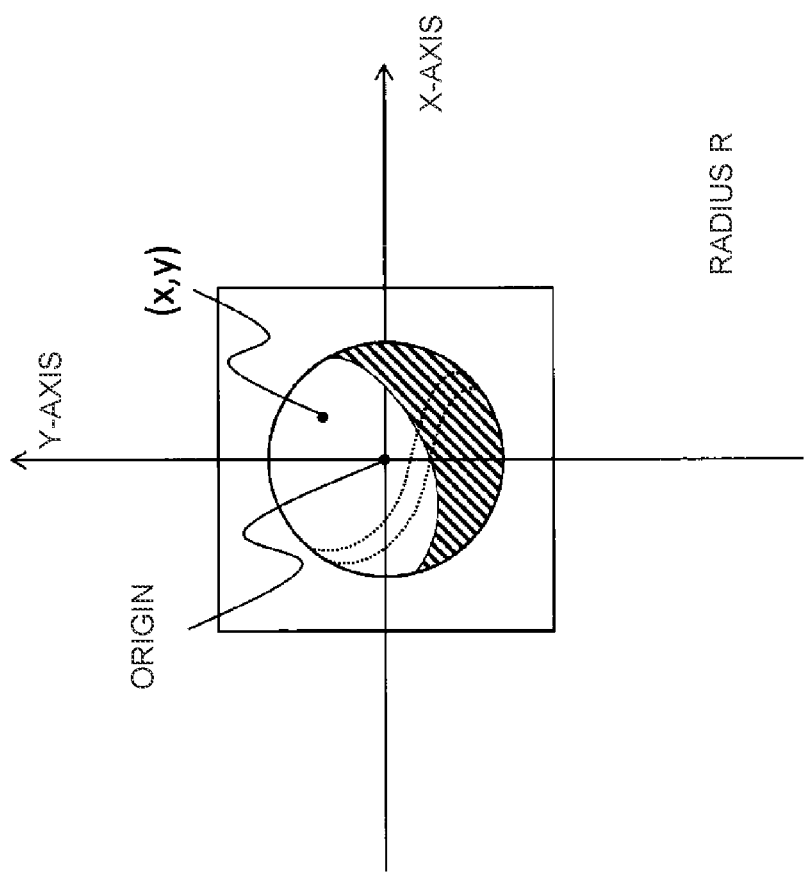
FIG. 5 is a diagram for describing an example of calculation of a depth z of an object.

For example, it is assumed that: the object is a baseball and has a spherical shape; and a spherical half of the ball is shown in the object image. In this case, as illustrated in FIG. 5, where R is a radius of the ball, which is a sphere, and an origin is a center of the ball, a depth z at optional coordinates (x, y) is $z=(R^2-x^2-y^2)^{(1/2)}$. Consequently, three-dimensional position (x, y, z) of each of pixels in an area of the ball can be obtained. Note that as a unit, a unit of an actual length can be used if an actual size of the object is known or the number of pixels can be used as a unit.

The rotational state estimation unit 3 rotates the three-dimensional positions (x, y, z). For example, Rodrigues' rotation formula can be employed for the rotation. A rotation matrix of clockwise rotation around a rotation axis $(n_x, n_y, n_z)$ having a length of 1 by $\theta$ can be defined as $$R_n(\theta) = \begin{bmatrix} \cos\theta + n_x^2(1-\cos\theta) & n_x n_y(1-\cos\theta) - n_z\sin\theta & n_x n_z(1-\cos\theta) + n_y\sin\theta \\ n_y n_x(1-\cos\theta) + n_z\sin\theta & \cos\theta + n_y^2(1-\cos\theta) & n_y n_z(1-\cos\theta) - n_x\sin\theta \\ n_z n_x(1-\cos\theta) - n_y\sin\theta & n_z n_y(1-\cos\theta) + n_x\sin\theta & \cos\theta + n_z^2(1-\cos\theta) \end{bmatrix}$$ [Math. 1]

according to Rodrigues' rotation formula.

The rotational state estimation unit 3 tests a likelihood of each of the hypotheses of the rotational state by comparing an image of the object, the image resulting from the object in the object image at the time t being rotated for $t_c$ unit time based on the hypothesis of the rotational state, and an actual object image at the time $t+t_c$.

More specifically, the rotational state estimation unit 3 calculates a degree of similarity between the actual object image at the time $t+t_c$ and an image of the object, the image resulting from the object in the object image at the time t being rotated for $t_c$ unit time based on a certain hypothesis of the rotational state, and determines the degree of similarity as a likelihood of the certain hypothesis (step S32). Here, a degree of similarity between two images is, for example, a value of an output when a Euclidean distance between samples corresponding to each other in the two images is input to a predetermined non-increasing function. An example of the predetermined non-increasing function is $f(x)=1/x$. The rotational state estimation unit 3 performs the hypothesis likelihood calculation for each of the plurality of hypotheses generated (step S32).

The rotational state estimation unit 3 determines whether or not the calculated likelihoods of the hypotheses meet a predetermined convergence condition (step S33). An example of the predetermined convergence condition is that a magnitude of a difference between a maximum value of the hypothesis likelihoods calculated last time and a maximum value of the hypothesis likelihoods calculated this time is equal to or below a predetermined threshold value.

If the calculated hypothesis likelihoods meet the predetermined convergence condition, the rotational state estimation unit 3 selects, for example, a hypothesis corresponding to the maximum value of the hypothesis likelihoods calculated this time, and outputs the rotational state in the selected hypothesis as a result of estimation of the rotational state of the object.

If the calculated hypothesis likelihoods do not meet the predetermined convergence condition, the rotational state estimation unit 3 newly generates a plurality of hypotheses by means of random sampling based on a hypothesis probability distribution determined by the likelihoods calculated in step S32 (step S31).

In other words, the rotational state estimation unit 3 newly generate a plurality of hypotheses by repeating, a plurality of times, processing for determining a hypothesis from among the plurality of hypotheses generated this time in such a manner as to determine a hypothesis having a larger likelihood calculated this time with a higher probability and determining a rotational state having a value resulting from addition of a random number to a value of the rotational state of the determined hypothesis, as a new hypothesis.

For example, N is the number of hypotheses generated this time and i (i=1, ..., N) is a hypothesis. Where i=1, ..., N, $x_i$ is a likelihood of a hypothesis i calculated this time. The rotational state estimation unit 3 calculates a total sum of likelihoods $x_i$ of hypotheses i calculated this time, $S=\Sigma_{i=1}^{N} x_i$. Then, the rotational state estimation unit 3 generates uniform random numbers x for a range [0, S). Then, the rotational state estimation unit 3 determines a hypothesis I satisfying a relationship of $(x-\Sigma_{i=1}^{I-1} x_i)>0\geq(x-\Sigma_{i=1}^{I} x_i)$. The rotational state estimation unit 3 determines a rotational state having a value obtained by addition of random numbers to respective values of the rotational state in the hypothesis I, as a new hypothesis. For example, it is assumed that: the rotational state of the hypothesis I is formed by a rotational axis ($r_x(I)$, $r_y(I)$, $r_z(I)$) and a rotation rate $\theta(I)$; and the random numbers are Gaussian noises $n_x$, $n_y$, $n_z$, $n\theta$. In this case, the rotational state of the new hypothesis is ($r_x(I)+n_x$, $r_y(I)+n_y$, $r_z(I)+n_z$, $\theta(I)+n\theta$). The rotational state estimation unit 3 repeats this processing a plurality of times (for example, N times) to newly generate a plurality of hypotheses.

Subsequently, the rotational state estimation unit 3 performs the processing in step S32 based on the plurality of hypotheses newly generated.

In this way, the rotational state estimation unit 3 repeatedly performs the processing in steps S31 and S32 until the likelihoods of the calculated hypotheses meet the predetermined convergence condition.

As above, the rotational state estimation unit 3 estimates a rotational state of an object by repeatedly performing processing for, for each of a plurality of hypotheses of the rotational state, calculating a likelihood of an image of the object resulting from the object in an object image at a time t being rotated for $t_c$ unit time based on the hypothesis of the rotational state, and processing for newly generating a plurality of likely hypotheses of the rotational state based on the calculated likelihoods.

The technique described in the Background Art section needs a video image corresponding to one period in order to estimate a rotational state of an object. On the other hand, the above embodiment enables estimation of a rotational state of an object using an object image at a time t and an object image at a time $t+t_c$. Here, $t_c$ may be smaller than the period T. Therefore, the above embodiment enables estimating a rotational state of an object even if a video image corresponding to one period is not obtained.

Figure 4:
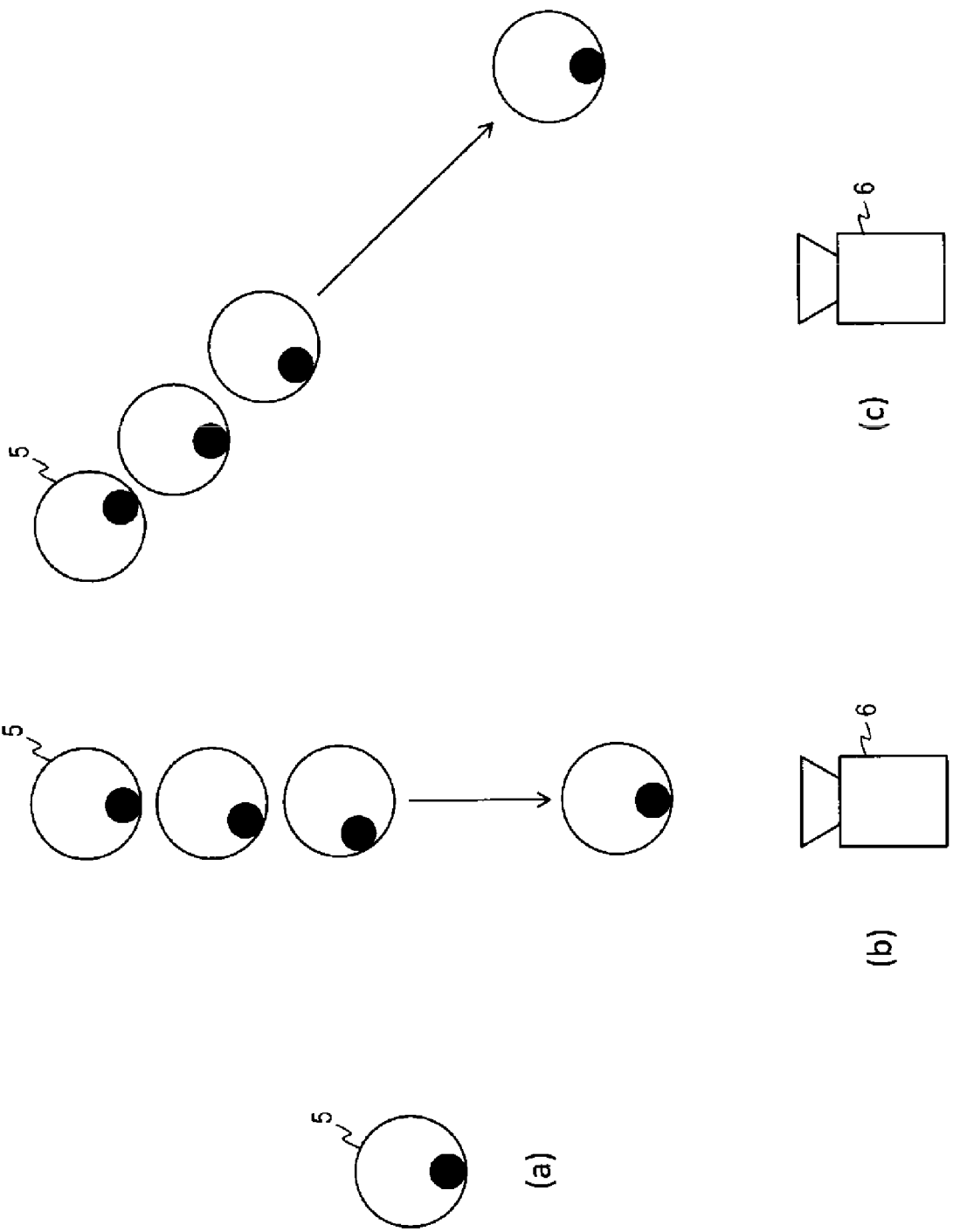
FIG. 4(a) is a diagram in which a pattern of a ball 5 is simplified for ease of understanding.
FIG. 4(b) is a diagram illustrating the ball 5 flying straight toward a camera 6.
FIG. 4(c) is a diagram illustrating the ball 5 flying obliquely relative to the camera 6.

Note that factors of a change in appearance of an object include a change in position of the object in addition to a change in pose of the object. For example, as in FIG. 4(c), where an object flies obliquely relative to a camera, a change in position of the object is a factor of a change in appearance of the object. If $t_c$ is smaller than the period T, since the above embodiment enables estimation of a rotational state of the object using images, a time interval between the images being shorter than that of the technique described in the Background Art section, the above embodiment enables reduction of an effect of change in appearance of the object due to a change in position of the object. Therefore, e.g., even where an object flies obliquely relative to a camera as in FIG. 4(c), the above-described embodiment enables estimating a rotational state of the object with an accuracy that is higher than that of the technique described in the Background Art section.

[Alterations]
<Alteration 1>

The rotational state estimation device may further include a feature-enhanced object image generation unit 2 that generates a feature-enhanced object image with a feature of an object enhanced, using an object image. The feature-enhanced object image generation unit 2 is indicated by a dashed line in FIG. 1.

In this case, the object images generated in the object image generation unit 1 are input to the feature-enhanced object image generation unit 2.

Then, the feature-enhanced object image generation unit 2 generates feature-enhanced object images with a feature of the object enhanced, using the object images (step S2).

The generated feature-enhanced object images are output to the rotational state estimation unit 3.

For example, the feature-enhanced object image generation unit 2 generates the feature-enhanced object images by performing edge extraction of the object images. Consequently, the feature of the object can be enhanced.

In many cases, a baseball, which is an example of the object, is provided with a mark and has a seam. Also, as illustrated in FIGS. 6(a) and 6(b), when a ball changes in position, a shadow on the ball may change according to a lighting environment.

The feature-enhanced object image generation unit 2 can clarify an appearance of the object by performing processing for feature enhancement, for example, edge processing and thereby minimizing an effect of the lighting environment. More specifically, the seam of the ball can easily be recognized.

In this case, the rotational state estimation unit 3 performs the processing in steps S31 and S32 and processing in alterations 2 to 4, which will be described later, using the feature-enhanced object images instead of the object images. In other words, object images used by the rotational state estimation unit 3 in order to estimate a rotational state may be feature-enhanced object images.

The feature-enhanced object image generation unit 2 has an advantage of enhancement in accuracy of the subsequent processing in the rotational state estimation unit 3 by performing processing for enhancing a feature of an object.

<Alteration 2>

In step S32, the rotational state estimation unit 3 may calculate likelihoods of hypotheses in consideration of a predetermined area in two images only. For example, the rotational state estimation unit 3 calculates likelihoods of hypotheses using a method in which for each of pixels included in an area, in which the object is displayed, of each object image, a direction normal to the object at a position of the pixel and only pixels in a direction toward the camera are used, or using only pixels located on the camera side relative to a predetermined threshold value using positions in the depth direction of the pixels relative to an image plane of the camera.

<Alteration 3>

The above-described technique is a technique that can be implemented using object images corresponding to two frames at the time t and the time $t+t_c$.

On the other hand, an estimation based on likelihoods may be performed over a plurality of frames. In other words, the rotational state estimation unit 3 may estimate a rotational state of an object by selecting a hypothesis of the rotational state, a likelihood of an image of the object resulting from the object in each of the object images at times $t_1, t_2, \ldots, t_K$ being rotated for $t_c$ unit time based on the hypothesis of the rotational state, from a plurality of hypotheses of the rotational state, using the object images at the times $t_1, t_2, \ldots, t_K$ and object images at times $t_1+t_c, t_2+t_c, \ldots, t_K+t_c$.

Note that where a baseball, a maximum value of the rotation rate of the baseball being around 2800, is the object and an image of the baseball is shot at 960 fps, empirically, an accuracy in estimation of the rotational state is settled at around k=10.

If a feature of appearance of the object is small, only consideration of object images corresponding to two frames at the time t and the time $t+t_c$ is insufficient for proper estimation of the rotational state of the object. This is because where a feature of an appearance of the object is small, a change in appearance of the object due to a change in pose of the object is also small.

Figure 7:
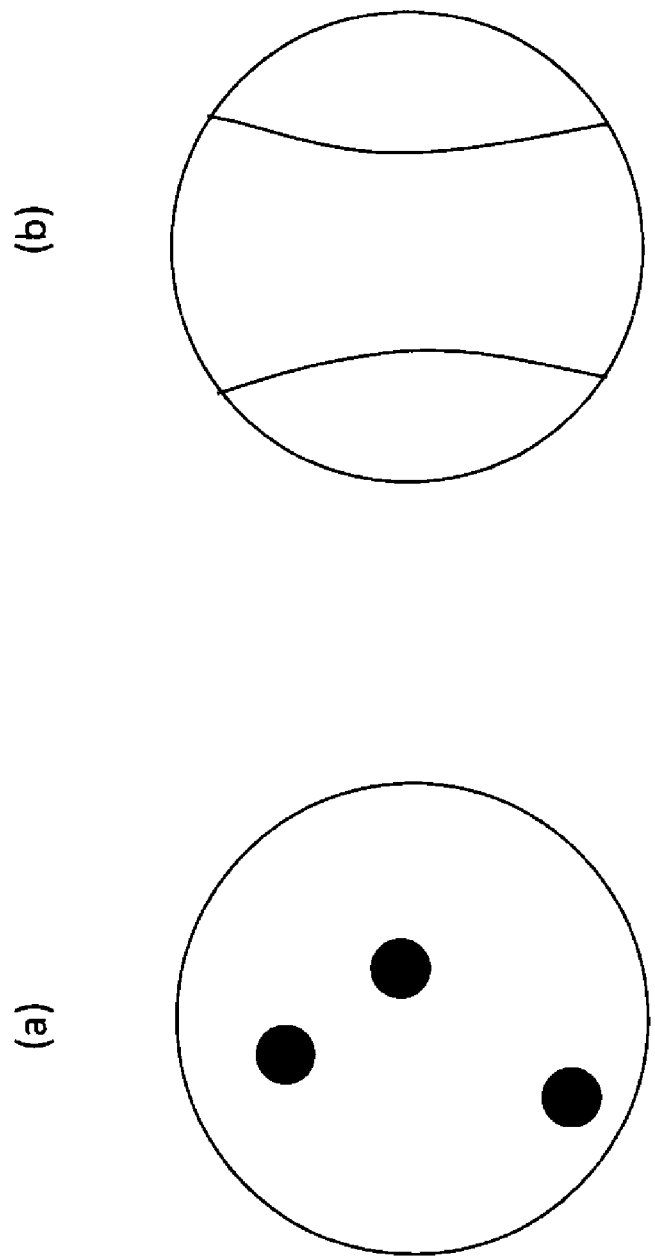
FIGS. 7(a) and 7(b) are diagrams each illustrating an example of a texture of the object.

For example, where the object has the texture in FIG. 7(a), it is easy to determine correspondence points (in this example, three correspondence points) in the image at the time t and the image at the time $t+t_c$. In this case, it is expected that the likelihood distribution in FIG. 8(a) is obtained by likelihood calculation using rotation between the times t and $t+t_c$ only. In FIG. 8(a), the abscissa axis represents the pose and the ordinate axis represents the likelihood. In this way, in a case where designation of correspondence points is easy, a width of a likelihood distribution is small.

On the other hand, for example, where the object has the texture in FIG. 7(b), if the object rotates in a vertical direction (rotates with a right-left direction (horizontal direction in FIG. 7(b)) as an axis), it is difficult to determine correspondence points. In this case, it is expected that the likelihood distribution in FIG. 8(b) is obtained by likelihood calculation using rotation between the times t and $t+t_c$ only. In FIG. 8(a), the abscissa axis represents the pose and the ordinate axis represents the likelihood. In this way, in a case where designation of correspondence points is difficult, a width of a likelihood distribution is large.

In the case of FIGS. 7(b) and 8(b), each object image is formed of edge components extending in the vertical direction in the relevant image, and thus, a change in likelihood according to an amount of rotation is small. Therefore, use of one set of frames becomes a major factor of a decrease in accuracy.

On the other hand, use of a plurality of sets of frames is expected to produce the distribution in FIG. 9. In other words, although a width of a likelihood distribution relative to a pose is large for each of the sets of frames, it is conceivable that as a result of the plurality of sets of frames being taken into consideration, the width of the likelihood distribution becomes narrow, enabling more proper estimation of the pose.

Alteration 3 is effective where an object is a physical body in which only a seam that smoothly changes, such as a baseball, can be seen as a feature.

<Alteration 4>

In the repeated processing in step S32, the rotational state estimation unit 3 may vary a value of $t_c$ used in the processing in step S32 of last time and a value of $t_c$ used in the processing in step S32 of this time different from each other.

For example, the rotational state estimation unit 3 may perform processing with $t_c=1$ in processing in step S32 of first N times and perform processing with $t_c=2$ in subsequent step S32.

Consequently, an amount of change in value of the rotational state in each of the generated hypotheses becomes large, enabling stable estimation of the rotational state.

<Alteration 5>

The rotational axis of the rotational state estimated by the above-described embodiment is a rotational axis in a camera coordinate system and thus changes according to a position and a pose of the camera. Therefore, where the object is a baseball, a rotational axis of the ball in a coordinate system of a baseball ground may be obtained by estimating the position and the pose of the camera and performing calibration in advance.

Where the object is a baseball, for example, the below processing in steps (a) to (f) may be performed.

(a) Bring the camera into a state in which an angle of shooting is widest.

(b) In such state as above, estimate intrinsic parameters of the camera. The intrinsic parameters of the camera include, e.g., a distortion of a lens of the camera and can be obtained by, e.g., the method in Reference Literature 1.

[Reference Patent Literature 1] Zhengyou Zhang, "A Flexible New Technique for Camera Calibration", IEEE Transactions on Pattern Analysis and Machine Intelligence, 22(11):1330-1334, 2000.

Reference Literature 2 includes details on intrinsic parameters of a camera.

[Reference Literature 2] Ryo Komiyama, "Intrinsic Parameters, Extrinsic Parameter and Distortion of Camera, for Review", [online], [Searched on Mar. 14, 2019], the Internet <URL: https://qiita.com/ryokomy/items/fee2105c3e9bfccde3a3>

(c) shoot an image in such a manner that a home base, first to third bases and a pitcher's plate can be observed from a shooting position.

(d) obtain a position and a pose of the camera in the coordinate system of the baseball ground by solving a PNP (perspective n-point problem) using the home base and the first to third bases, respective positions of which are known in the baseball ground. Reference Literature 3 includes details on PNP. In Reference Literature 3, it is assumed that a solution of P3P is obtained.

[Reference Literature 3] "Camera Position and Pose Estimation 2 PNP Theory Section", [online], [searched on Mar. 14, 2019], the Internet <URL: http://daily-tech.hatenablog.com/entry/2018/01/21/185633>

(e) as necessary, perform zooming, obtain a ball image by means of the above embodiment and obtain a rotational axis of the ball in the camera coordinate system.

(f) the rotational axis of the ball in the coordinate system of the baseball ground can be obtained from the rotational axis obtained in step (e) and the pose of the camera obtained in step (d).

Although an embodiment of the present invention and alterations thereof have been described above, it should be understood that: the specific configuration of the present invention is not limited to the embodiment and the alterations; and the present invention include any appropriate design change, etc., without deviating from the spirit of the present invention.

For example, the above alterations may optionally be combined.

Also, data may be transmitted or received between the component units of the rotational state estimation device directly or via a non-illustrated storage unit.

Furthermore, various processing steps described in the embodiment may be performed not only chronologically according to the order in which the processing steps are described, but also in parallel or individually according to a processing capacity of the device that performs the processing steps or as necessary.

[Program and Recording Medium]

Where various processing functions in the above-described rotational state estimation device are implemented by a computer, the content of processing by each of the functions that respective devices should have is described by a program. Then, upon execution of the programs by the computer, various processing functions in the respective devices are implemented in the computer.

The programs that describe the respective processing contents can be recorded on a computer-readable recording medium. The computer-readable recording medium may be any one, for example, a magnetic recording device, an optical disk, a magnetooptical recording medium or a semiconductor memory.

Also, distribution of the programs is conducted by, e.g., sale, transfer or lending of a removable recording medium such as a DVD or a CD-ROM with the programs recorded thereon. Furthermore, the programs may be distributed by storing the programs in a storage device of a server computer and transferring the programs from the server computer to another computer via a network.

A computer that executes such programs, for example, first, stores the programs recorded on the removable recording medium or the program transferred from the server computer in its own storage device once. Then, at the time of performing processing, the computer reads the programs stored in its own storage device and performs processing according to the read programs. Also, as another mode of execution of the programs, the computer may read the programs directly from the removable recording medium and perform processing according to the programs, or each time the program is transferred from the server computer to the computer, the computer may perform processing according to the received programs. Also, the above-described processing may be performed by what is called ASP (application service provider) service in which the processing functions are implemented by an instruction for execution of the programs and acquisition of a result of the execution without transfer of the programs from the server computer to the computer. Note that the programs in the present mode include information provided for processing by an electronic calculator, the information being equivalent to a program (e.g., data that is not a direct instruction to the computer but has a nature of specifying processing in the computer).

Also, although in this mode, the present device is configured by performing predetermined programs in a computer, at least a portion of the processing contents may be implemented using hardware.

REFERENCE SIGNS LIST 1 object image generation unit
2 feature-enhanced object image generation unit
3 rotational state estimation unit

The invention claimed is:

1. A rotational state estimation device comprising:
processing circuitry configured to
generate a first object image of an object and a second object image of the object, from an input video image of the object in rotation; and
estimate a number of rotations of the object in a predetermined time by selecting, among a plurality of hypotheses of the rotational state, a hypothesis of the rotational state using the first object image of the object at time t and the second object image of the object at a time $t+t_c$, wherein $t_c$ is a predetermined integer of no less than one, wherein the selecting is performed based on a determination that a calculated hypothesis likelihood for the selected hypothesis has a maximum value of calculated hypothesis likelihoods of the plurality of hypotheses, and wherein the hypothesis likelihood for the selected hypothesis indicates a highest likelihood of a rotational state of the second object image of the object matching a rotational state of a third object image of the object at a time $t+t_c$, and wherein the third object image of the object represents the object in the first object image at the time t being rotated for $t_c$ unit time based on the hypothesis of the rotational state.

2. The rotational state estimation device according to claim 1, wherein the processing circuitry configured to estimate the rotational state of the object by selecting, from among a plurality of hypotheses of the rotational state, a hypothesis of the rotational state, a likelihood of the third object image of the object resulting from the object in respective object images of the object at times $t_1, t_2, \ldots, t_K$ being rotated for $t_c$ unit time based on the hypothesis of the rotational state being high, using the respective object images at the times $t_1, t_2, \ldots, t_K$ and respectively corresponding object images at times $t_1+t_c, t_2+t_c, \ldots, t_k+t_c$.

3. The rotational state estimation device according to claim 1, wherein the processing circuitry configured to repeatedly perform processing for, for each of the plurality of hypotheses of the rotational state, calculating a likelihood of an image of the object resulting from the object in respective object images at the times $t_1, t_2, \ldots t_K$ being rotated for $t_c$ unit time based on the hypothesis of the rotational state, and processing for newly generating a plurality of likely hypotheses of the rotational state based on the calculated likelihoods.

4. The rotational state estimation device according to claim 3, wherein the processing for newly generating a plurality of likely hypotheses of the rotational state based on the calculated likelihoods, the processing being performed by the processing circuitry, is processing for newly generating a plurality of hypotheses by repeating, a plurality of times, processing for determining a hypothesis from among the plurality of hypotheses of the rotational state in such a manner as to determine the hypothesis, the calculated likelihood of the hypothesis being larger, with a higher probability, and determining the rotational state having a value resulting from addition of a dynamically generated number to a value of the rotational state of the determined hypothesis as a new hypothesis.

5. A rotational state estimation method comprising:
an object image generation step of causing an object image generation unit to generate a first object image of an object and a second object image of the object, from an input video image of the object in rotation; and
a rotational state estimation step of causing a rotational state estimation unit to estimate a number of rotations of the object in a predetermined time by selecting, among a plurality of hypotheses of the rotational state, a hypothesis of the rotational state using the first object image of the object at time t and the second object image of the object at a time $t+t_c$, wherein $t_c$ is a predetermined integer of no less than one, wherein the selecting is performed based on a determination that a calculated hypothesis likelihood for the selected hypothesis has a maximum value of calculated hypothesis likelihoods of the plurality of hypotheses, and wherein the hypothesis likelihood for the selected hypothesis indicates a highest likelihood of a rotational state of the second object image of the object matching a rotational state of a third object image of the object at a time $t+t_c$, and wherein the third object image of the object represents the object in the first object image at the time t being rotated for $t_c$ unit time based on the hypothesis of the rotational state.

6. A non-transitory computer readable medium that stores a program for making a computer perform the respective steps of the rotational state estimation method according to claim 5.

* * * * *